(No Model.) F. BREYER. 2 Sheets—Sheet 2.
PROCESS OF PRODUCING FILTERING MEDIA.
No. 321,947. Patented July 14, 1885.
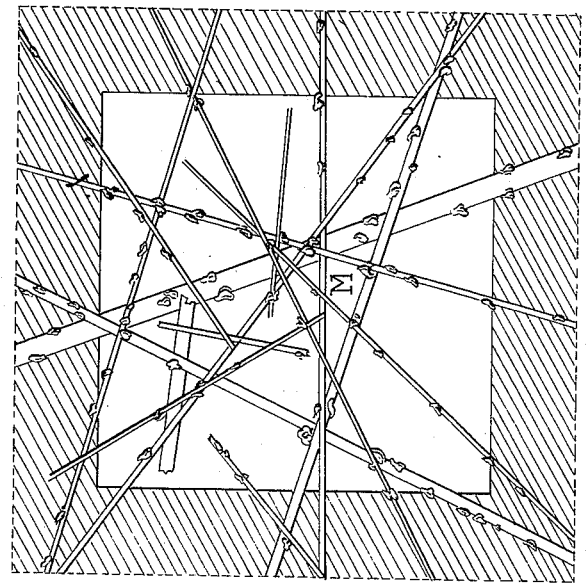
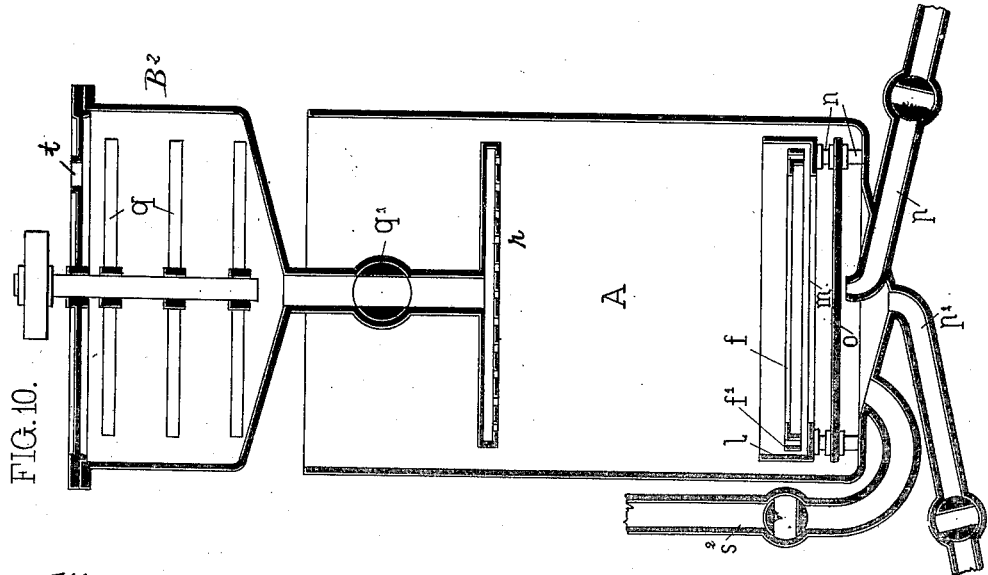
Witnesses.
N. E. Boulter
G. W. Knotts
Inventor
Friedrich Breyer
pr Henry Orth
his att'y

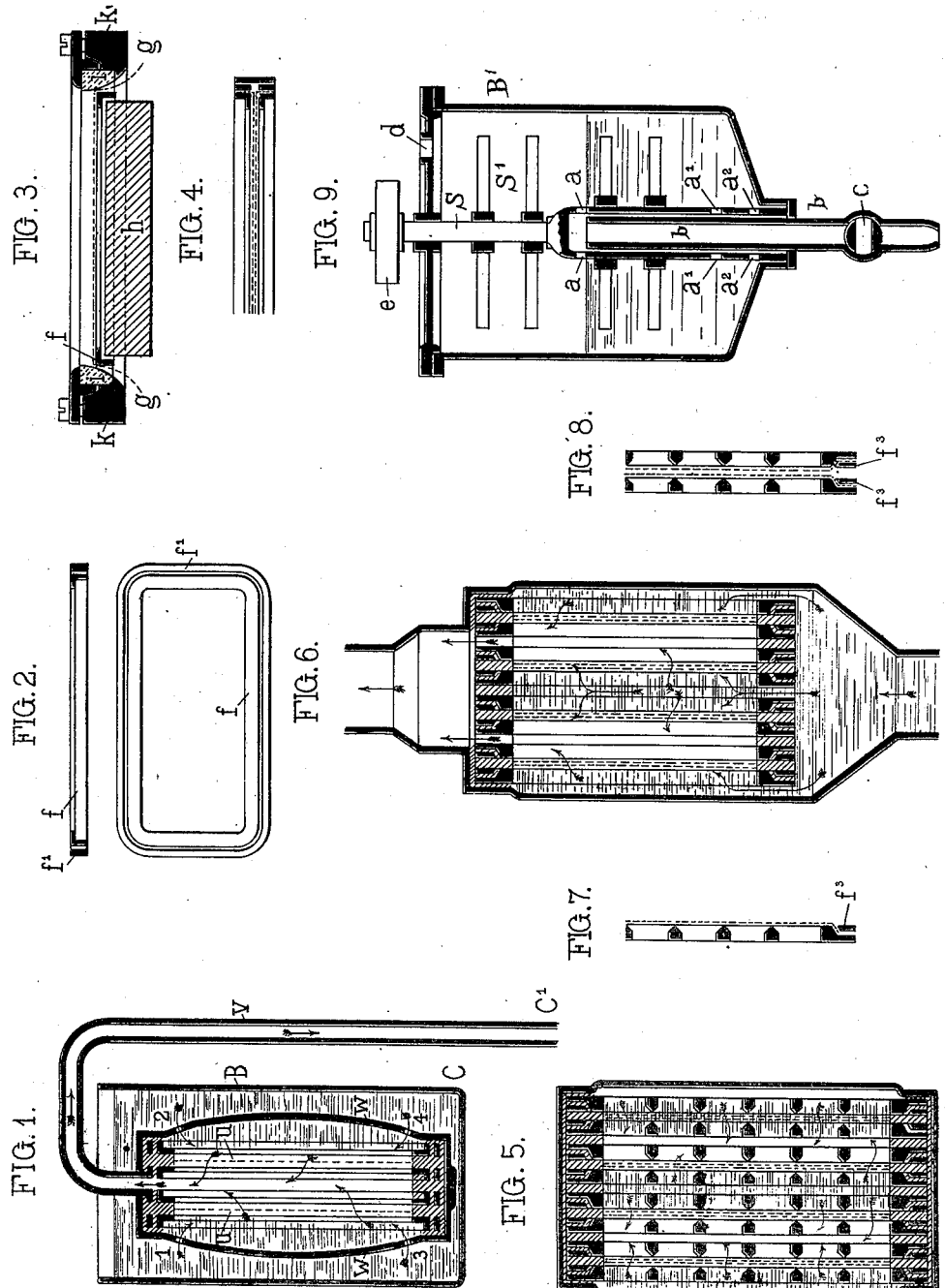

UNITED STATES PATENT OFFICE.

FRIEDRICH BREYER, OF VIENNA, AUSTRIA-HUNGARY.

PROCESS OF PRODUCING FILTERING MEDIA.

SPECIFICATION forming part of Letters Patent No. 321,947, dated July 14, 1885.

Application filed May 23, 1883. (No model.) Patented in Belgium April 19, 1883, No. 61,164; in France April 20, 1883, No. 154,994, and May 26, 1884, No. 162,364; in Germany April 21, 1883, No. 25,709; in England April 24, 1883, No. 2,087; in Italy April 30, 1883, XVII, 15,373, XXX, 379, and in Austria-Hungary August 29, 1884, No. 14,122 and No. 39,090.

*To all whom it may concern:*

Be it known that I, FRIEDRICH BREYER, civil engineer, subject of Austria-Hungary, residing at the city of Vienna, in the Province of Nether-Austria, in the Empire of Austria-Hungary, have invented certain new and useful Improvements in the Art of Producing Porous Membranes or Media for Eliminating Micro-Organisms from Fluids, (for which Letters Patent have been obtained in Austria-Hungary, Nos. 14,122 and 39,090, dated August 29, 1884; in Germany, No. 25,709, dated April 21, 1883; in France, No. 154,994, dated April 20, 1883, and No. 162,364, dated May 26, 1884; in Belgium, No. 61,164, dated April 19, 1883; in Italy, Nos. 15,373 and 379, dated June 30, 1883, and in England, No. 2,087, dated April 24, 1883;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to novel processes of producing porous media for eliminating micro-organisms from fluids, (liquid or gaseous;) and it consists, broadly, in the process of producing the media by forming a microlithic deposit upon a porous backing or support therefor, such as a deposit of finely-subdivided calcium magnesium, (asbestus, amianthus, bostonite, or other analogous mineral fibrous substance.)

It further consists in the process of preparing the backing or support and the depositing of the microliths by subjecting wire-gauze to the action of an electrolythic bath and depositing on the wires thereof a coating of metal, and then depositing on the so prepared backing one or more layers of microliths.

It further consists in the process of connecting the deposited microliths to the backing by means of an insoluble inorganic adhesive agent; and, lastly, the invention consists in a porous media for filtering purposes, composed of a porous backing or support and one or more strata of microliths connected therewith, substantially as hereinafter more fully described.

I have hereinabove employed and shall hereinafter employ the word "microlith," derived from two Greek words, "micros," small, and "lithos," a stone, in order to convey a more correct idea of the substance that actually forms the filtering strata, which, in fact, is a practically insoluble fibrous mineral or stony substance—namely, calcium magnesium, better known as "asbestus," "bostonite," "amianthus," "talc," &c.

I have shown in the accompanying drawings not only the necessary means for producing the filtering media, but also a mode of arranging the same for practical use. I wish it, however, understood that although I do not in this application lay claim to either the apparatus for effecting the deposit of the microliths upon the backing or support therefor, and for connecting the microliths to said backing or support, or to the process of effecting the reduction and division of the calcium magnesium, or to any special construction of filter in which said media are employed, yet I reserve myself the right to make separate applications for patents for said matters of invention, and have given illustrations thereof in order to enable others to fully comprehend the scope of my invention and the manner of carrying the same into practical effect.

In the accompanying drawings, Figure 1 shows a vertical section of the apparatus as constructed in a compendious and convenient form for eliminating micro-bodies and micro-organisms from impure water, so as to render the same potable. Figs. 2, 3, and 4 show the details thereof. Fig. 5 shows a horizontal section, and Fig. 6 a vertical section, of a modified construction of the separator of increased eliminating power, more especially intended for the elimination of micro organisms and bodies from atmospheric air and other gases. Figs. 7 and 8 are detail views of the same. Fig. 9 shows a longitudinal section of an apparatus for mixing and sorting the reduced microliths previous to their application to the separating-screens or filtering media. Fig. 10 shows by a like view an apparatus for producing the filtering media. Fig. 11 shows a small part of a filtering medium on a greatly magnified scale. Figs. 12, 13, 14, 15, 16, and 17 are various micro-bodies, enlarged to the same scale.

In carrying out my invention I first reduce the inorganic material, talc, asbestos, or bostonite into microliths or microlithic fibers. I have found that this may be readily effected by reduction between rollers or in any ordinary rag-engine in conjunction with sufficient water to keep the material and operating or reducing mechanism immersed. By this means I am enabled to obtain fibers of greater fineness than cocoon-silk or spider-threads, in fact, fibers from 0.000012 to 0.000015 inch in diameter, and of a length from 10,000 to 100,000 times their diameter. The microlithic fibers so obtained are then graded according to their fineness, and this I effect in any suitable apparatus by availing myself of the specific gravity of the fibers.

In Fig. 9 I have shown a form of apparatus for grading or assorting the fibers which has given excellent results. It is composed of a cylindrical vessel, B', in which is arranged a shaft, S, carrying stirring-blades S'. One-half (more or less) of this shaft is hollow and contains a pipe, $b$, provided with a stop-cock, $c$. The pipe, as shown, extends nearly the entire length of the hollow portion of the shaft S, which has outlet-ports $a\ a'\ a^2$ at different elevations, and is rotated through a belt-pulley, $e$, from any suitable prime motor. The microliths as they come from the reducing-engine are charged into the cylinder B' mixed with a volume of water from one thousand to two thousand times greater, by weight than the weight of the dry microliths, and then thoroughly stirred, so that the fibers will be held in suspension at different elevations according to their specific gravity, the finer fibers passing from the cylinder through ports $a$ and the discharge-pipe $b$ into a suitable receiver, the next grade through ports $a'$ into a separate receiver, and the coarser fibers through ports $a^2$ into a third receiver, the pipe $b$ being adjusted within the shaft S as the various strata are drawn off. According to the use made of the filtering media, finer or coarser microliths are or may be deposited thereon, the coarsest being usually returned to the reducing-engine and further reduced. In this preparation of these filtering media the fibers are deposited upon a suitable porous or permeable backing or support, for which purpose various materials may be employed, such as perforated metallic plates, wire-woven fabrics, and other suitable perforated or highly porous or permeable materials, the nature of which will also depend upon the uses made of the media, and should be of such a character as not to be affected by the liquid or gas to be filtered.

For general uses, for filtering liquids and gases, I employ wire-gauze as a support or backing, which is first stretched smoothly and firmly upon a suitable frame or grating, Figs. 2, 3, 4, and 7, of any suitable form, according to the uses made of the media. Wire-gauze having a mesh of 0.0078 inch made of wire of a diameter of 0.00355 inch is well suited for this purpose. After the gauze $g$ has been properly stretched in the frames or gratings $f$ $k$, two such are secured together, with the gauze surfaces facing each other, with an intervening sheet of vulcanite or rubber, as shown in Fig. 8. These couples are then introduced into an electrolithic bath, and the wire-gauze electroplated, to stiffen the wire, and connect them at their intersections by a metallic connection. When so treated, the backing or support is ready to receive the coating or deposit of microliths which may be effected in any suitable manner and by any suitable means, care being taken that the layer or layers of microliths deposited on the gauze be as uniform as possible.

In Fig. 10 I have shown a form of apparatus by means of which this uniform depositing and cementing of the microliths may be effected with facility by subsidence or precipitation. The apparatus is composed of a cylindrical vessel, A, having discharge-pipes $p\ p'$. Above the vessel is arranged a charging-hopper provided with an agitator, $q$, operated from a belt-pulley on its shaft. The hopper has a discharge-pipe provided with a stop-cock, $q'$, that projects some distance into the vessel A, where it terminates in one or more perforated branches, $r$, radiating therefrom. One of the electroplated gauze supports, with its frame or grating $f'$, and with the wire-gauze uppermost, is placed in a receiver, $l$, open at top and bottom, and supported above the bottom of vessel $l$ on feet $n$. Between the receiver and the bottom of the vessel is arranged a false bottom, $m$, which serves to prevent eddies when the charge is drawn off. A hot or boiling solution of a soluble silicate of soda or potassa, (water-glass,) in the proportion of about one part, by weight, of the silicate to about one hundred parts, by weight, of water, is then introduced into the vessel A, until the gauze in receiver $l$ is completely immersed, to drive out of its meshes all the air. The vessel A is then nearly filled with a cold solution of the silicate, and the charging-hopper lowered into it. A charge of microlith and water is then introduced into the hopper, the stop-cock $q'$ being closed, and the stirrers set in motion to thoroughly suspend the fibers in the liquid, when the stop-cock is opened and the charged solution allowed to flow through the perforated branch or branches $r$ into the silicated bath.

The proportion of water introduced into the silicated bath with the microliths should be such that the entire volume of liquid in A will be from three thousand to four thousand times greater than the volume of microliths, and contain about five per cent. of silicate of a specific gravity of from 1.25 to 1.30.

When the microlithic fibers are of a coarser grade, the subsidence or precipitation takes place in from one to one and one-half hours, with the finer grades from six to twelve hours, and with the finest a somewhat longer time is required.

The completion of the deposit may be readily ascertained, the wire-gauze presenting a snowy-white surface, clearly seen through the liquid, which is then drawn off through pipe p, the contracted opening of which projects nearly to the under side of the false bottom m.

The discharge of the solution should be effected slowly, so as not to cause any disturbance in the liquid within the vessel A, and a consequent displacement of the microlithic deposit thereon. In fact, I have found it advantageous to draw the liquid off at such a slow rate, as if the whole of the solution had to pass through the deposited microliths. Of course the apparatus should be so arranged as to be unaffected by any vibratory movements or jarring of its supports.

After the solution has been drawn off, the frames $f'$ $c$ are removed, and are then ready for the cementing process, which consists of two distinct steps—namely:

First. The process of crystallization, which is effected by subjecting the filtering medium to a temperature of from 212° to 248° Fahrenheit, the completion of which is ascertained by the uniform white and shining appearance of the deposit. A notable change occurs during the crystallization of the silicate. The microliths will be found to lie closer and adhere to the gauze backing, while the film of silicate that cements the fibers to one another and to the backing is cracked or ruptured, forming innumerable inorganic connections between said fibers and their backing.

The filtering media, so prepared, may be used for certain purposes—as for the filtration of dry gases or air—but as the silicate is soluble any moisture coming in contact therewith will tend to dissolve the same and render the medium useless. It is therefore necessary for general purposes of filtration to convert the soluble silicate into an insoluble inorganic body, and this constitutes the second step in the process of cementation, which is effected as follows:

The filtering media, after crystallization of the silicate, are placed in a solution of about three parts of chloride of calcium or chloride of magnesium in about one hundred parts of water, until the reaction of the solution on the silicate and its conversion into an insoluble salt has taken place, which will be in from four to six hours. In this reaction a change takes place in the silicate which is of the greatest importance. The silicate is to some extent dissolved and rolls up into minute globules that attach themselves under occlusion of common salt in the form of micro-crystals of insoluble silicate of lime, magnesia, or barium, according to the salt employed, to the microliths and their backing, thus forming an inorganic and insoluble cement or connection between them and their support.

In Fig. 11 I have shown a mesh of wire-gauze with its microlithic layer greatly magnified, from which it will be seen that the insoluble silicate forms itself into globules or warts. By optical measurement and calculation the layer of microliths is about 0.00127 inch thick at its greatest thickness, and from eight to ten such layers form a diffuse mass impenetrable to the rays of light under the microscope.

In order to convey a more correct idea of the dimensions of these microliths, I have shown in Figs. 12 to 17 a globule of human blood, a cell of beer ferment, a mildew-spore, a thread of cocoon-silk, a thread of spider-web, and a microlith, respectively enlarged in the same proportion as the mesh of filtering medium, Fig. 11.

According to the density of the layer of microliths on its backing, the above-described steps of depositing, cementing, and converting may be repeated any number of times.

By the described means I am enabled to obtain filtering media from about 0.01 to 0.012 inch thick to every 0.015 square inch, having from three hundred thousand to four hundred thousand apertures, from which it will be seen that about one-third of the filtering-surface may be considered as open space, thus offering to the passage of a liquid or gas no other resistance than that of friction. In general, I may state that for every 0.0015 square inch of surface from 0.11 to 0.15 grain of microliths are required to form a medium 0.001 inch in thickness.

To increase the durability of the filtering media, two of them may be secured together, with their microlithic surfaces facing each other, as shown in Figs. 4 and 8, the former showing two framed media and the latter two media supported from gratings, and these couples I have termed "filtering elements." They may be arranged in any convenient manner for filtering purposes, or in windows or other openings for purifying atmospheric air entering into or escaping from a building; or they may be arranged in any desired or convenient manner for filtering liquids or gases.

In Fig. 1 I have shown a portable filter for domestic or other purposes, and in Figs. 5 and 6 a stationary filter, more especially adapted for filtering gases.

As I do not desire to claim a specific construction of filter in this application, I deem it unnecessary to describe the same in detail.

I have hereinabove described a process of connecting or attaching the microliths with or to their support or backing by means of an inorganic soluble or insoluble silicate. Other chemicals or salts, whereby like results may be obtained, can, however, be employed.

Having now described my invention, what I claim is—

1. The herein-described process of producing filtering media, which consists in cementing one or more layers of a finely-divided inorganic or mineral fibrous substance upon a porous or permeable support by means of a soluble salt and converting said salt into an insoluble salt, for the purposes specified.

2. The herein-described process of producing filtering media, which consists in depositing upon a permeable or porous backing or support an inorganic or mineral fibrous substance, cementing or attaching the same thereto by means of a soluble silicate, and converting the soluble silicate into an insoluble silicate by the reaction of a chloride, for the purpose specified.

3. The herein-described process of producing filtering media, which consists in forming a layer or layers of finely-divided calcium magnesium—such as asbestus, amianthus, bostonite—upon a porous backing or support, and cementing the calcium magnesium thereto by treatment, first, in a solution of a soluble silicate of soda or potash, and then converting the soluble silicate into an insoluble silicate by means of a chloride—such as chloride of calcium magnesium or barium—for the purpose specified.

4. The herein-described process of producing filtering media; which consists in electroplating a woven metallic fabric, and cementing thereto one or more layers of fibers of an inorganic or mineral fibrous substance, for the purpose set forth.

5. The herein-described filtering medium, composed of a porous backing and a layer or layers of a finely-divided inorganic or mineral fibrous substance cemented thereto.

6. The herein-described filtering medium composed of a porous backing and a layer or layers of finely-divided calcium magnesium—such as asbestus or amianthus or bostonite—cemented or attached thereto by an inorganic cement.

7. The herein-described filtering medium, composed of a metallic gauze backing and a layer or layers of an inorganic or mineral substance cemented thereto by an inorganic cement.

8. The herein-described filtering medium, composed of an electroplated metallic gauze backing and a layer or layers of an inorganic or mineral fibrous substance, cemented thereto by means of an inorganic cement.

In testimony whereof I affix my signature in presence of two witnesses.

FRIEDRICH BREYER.

Witnesses:
JAMES RILEY WEAVER,
WILLIAM HÜNING.